United States Patent [19]
Watson et al.

[11] Patent Number: 6,041,946
[45] Date of Patent: Mar. 28, 2000

[54] COMPACT DISC HOLDER

[76] Inventors: Kalvin Watson, 6830 S. Lowe, Chicago, Ill. 60621; Raymond White, 15405 Oxford Dr., Orland Park, Ill. 60462

[21] Appl. No.: 09/167,082

[22] Filed: Oct. 6, 1998

Related U.S. Application Data

[62] Division of application No. 08/823,612, Mar. 25, 1997, Pat. No. 5,857,575.

[51] Int. Cl.⁷ .................................................. A47G 29/00
[52] U.S. Cl. ............................................................ 211/40
[58] Field of Search ................................. 211/40, 88, 87, 211/41; 206/308.1

[56] References Cited

U.S. PATENT DOCUMENTS

| | | |
|---|---|---|
| 4,951,826 | 8/1990 | Tompkins . |
| 5,040,687 | 8/1991 | Whittington . |
| 5,402,882 | 4/1995 | Bandy et al. . |
| 5,533,614 | 7/1996 | Walker . |
| 5,570,791 | 11/1996 | Sommi . |

*Primary Examiner*—Alvin Chin-Shue
*Assistant Examiner*—Sarah Purol
*Attorney, Agent, or Firm*—Robert J. Depke; Mayer, Brown & Platt

[57] ABSTRACT

An improved compact disc holder is disclosed for the safe and convenient temporary storage of a digital optical compact disc. The disc holder may be adhesive backed for conveniently mounting to a flat surface or alternately the disc holder may be incorporated into a weighted base to be self supporting. Advantageously, the disc holder provides one or more surfaces for the prominent display of an advertisement.

1 Claim, 6 Drawing Sheets

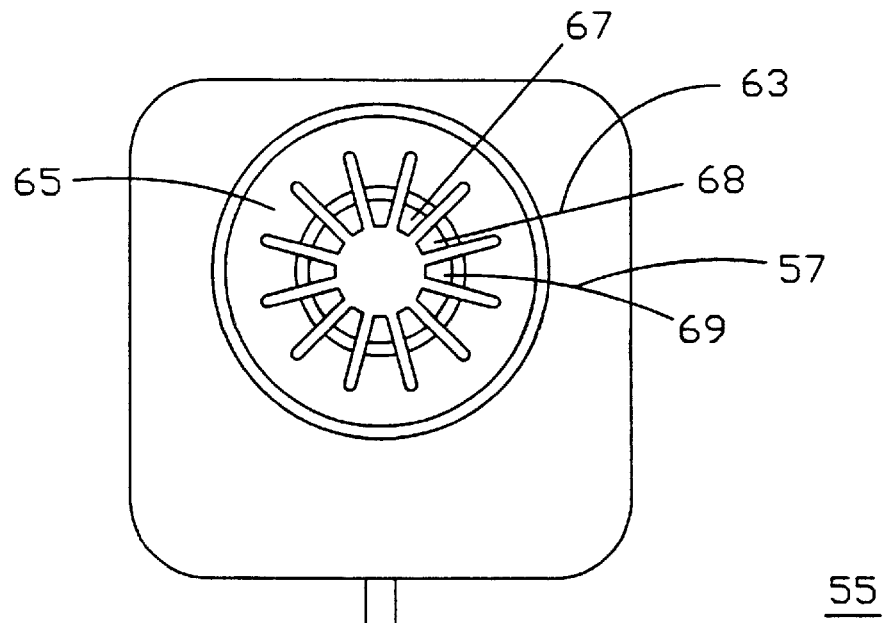
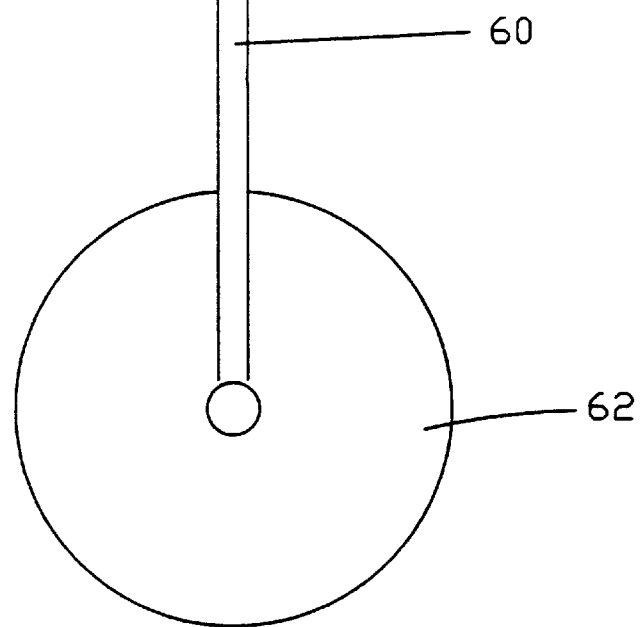
FIG 4

COMPACT DISC HOLDER

This application is a division of application Ser. No. 08/823,612 filed Mar. 25, 1997, now U.S. Pat. No. 5,857,575.

BACKGROUND OF THE INVENTION

1. Field of the Invention

The present invention relates generally to the field of optical disc storage devices and, more particularly, the present invention relates to unique structures for temporary storage and easy access to digital compact discs.

2. Description of the Related Art

The dramatic growth in the use of personal computers and the popularity of audio compact discs has resulted in a tremendous increase in the overall use of digital optical compact discs. While previously digital optical compact discs were primarily dedicated to the storage of audio information for playing back music, these discs are now commonly used with personal computers for accessing and retrieving information and for storing computer programs. Although there has been a significant increase in usage of digital optical compact discs, the storage locations for these devices have not changed at all.

Conventional storage devices for digital optical compact discs include examples such as the folding unit for in which audio discs are typically purchased and stored. Additionally, boxes are now available for storing discs. In such a storage unit, the discs may be located within plastic sleeves for storing the discs adjacent to one another in a row within the box. Other conventional storage devices for compact discs provide for storage of discs which are located within the folding package in which the disc is originally purchased. These devices are designed to store many discs which are located within the folding packages in which the discs are purchased. In such devices, the disc packages are typically stacked or otherwise arranged.

The problem with these existing disc storage devices is that they do not allow the user to readily access the disc. When a person using such a device changes between discs, the person is required to remove the currently used disc from the computer or audio disc player and return the disc to its original disc folder. The user then must open another disc package. This is a very time consuming process and often times users who are in a hurry will simply lay the disc on a flat surface and remove the next disc from its package. The problem with doing this is that the disc may easily be damaged when it is not located within a protective cover. This obviously is very undesirable because a damaged disc must be replaced.

The problem of disc access is even more common now with the increase in use of discs associated with personal computers. It is typical that a computer user will have two to three primary discs which are used in conjunction with the person's personal computer. These primary discs may hold the most commonly used software or reference materials such as a dictionary or thesaurus. In ordinary usage, the person may repeatedly exchange the disc in the disc drive throughout the day. Similarly, a person using an audio CD player in a car may have a limited number of favorite compact discs which are brought along on any given trip.

As noted, because the conventional devices are inconvenient to use, many users simply place the compact disc on an available surface without regard to possible damage to the information storage surface of the disc. This is especially true when the discs are repeatedly exchanged. This often results in a damaged disc which is a significant problem especially in the field of computers because replacement of computer software is not nearly as simple as replacing a damaged audio disc. Thus there remains a need in the art for a novel disc storage device which allows a user to readily access a computer or audio disc in a storage unit There is also a need for a storage unit which can easily receive a disc for temporary storage in a location which will minimize the risk of damage to the disc.

Accordingly, it is an object of the present invention to provide unique structures for storing digital compact discs in a manner which provides ready access to the disc while also securing the disc in a position to prevent it from being damaged. Another object of the present invention is to provide a location for easy access to the digital optical compact discs. Yet another object of the present invention is to provide a surface upon which companies may advertise their names while providing digital compact disc users with a place for easily retrieving discs which are commonly used. Other objects of the advantages will be apparent from the following detailed description of the preferred embodiments when viewed in light of the drawings.

SUMMARY OF THE INVENTION

The present invention relates to an improved compact disc holder which provides simple and convenient access to a compact disc while safely storing the disc in a location which prevents damage to this disc. The disc holders of the present invention may be either self supporting or attached to another surface which provides support A first embodiment of the present invention provides a first flat surface which may be adhesive-backed for securing the disc holder on a horizontal or vertical surface. An elevated member protrudes from the flat surface and presents a second flat surface having a plurality of detents circumferentially arranged and centrally located for engaging with a hole centrally located in a digital optical compact disc. The plurality of detents are similar to the detents located in a conventional compact disc package folding package. These flexible detents allow a user to temporarily secure a disc to the disc holder without damaging the disc while also allowing easy access to the disc.

Advantageously, the first surface of the disc holder may also present an advertisement for a company name, logo or slogan. Typically, a user would likely locate the disc storage device of the present invention in a prominent location and the advertisement placed on the surface of the disc holder would provide a prominent location for the advertisement. Self-supporting versions of the disc holder could be located on a desk and may also act as a paper weight. In such an embodiment, the first and second surfaces of the disc support device would be incorporated into a weighted base to allow the disc holder to be self-supporting without requiring a further flat surface for support.

Adhesive backed versions of the disc holder could be located on a wall or other convenient surface. For example, an adhesive-backed version of the present invention could be mounted on the dash board or glove box of a car so that a person could have convenient and safe access to a number of audio discs while driving.

In alternate embodiments of the present invention, the supporting member may be located on a further support such as a stiff or flexible rod which may be secured to a flat surface via a suction cup. In another alternate embodiment of the present invention, the supporting member may be located on an elongated, flat surface for more securely holding the support to a flat surface.

Yet another embodiment of the present invention allows a plurality of discs to be stored on a supporting ring. The ring is desirably secured to a weighted base and may consist of two semicircular portions with spacing members for temporarily securing a plurality of discs around the ring. In this embodiment, if two rings are co-located, each of the rings would be hingedly mounted for opening and closing and allowing access to the discs. Other objects, features and advantages of the present invention will become apparent from the following detailed description of the preferred embodiments when viewed in light of the drawings.

BRIEF DESCRIPTION OF THE DRAWINGS

FIG. 4 illustrates an embodiment of the invention wherein the disc holder is affixed to an elongated stiff or flexible rod;

DETAILED DESCRIPTION OF THE PREFERRED EMBODIMENTS

Figure 1:
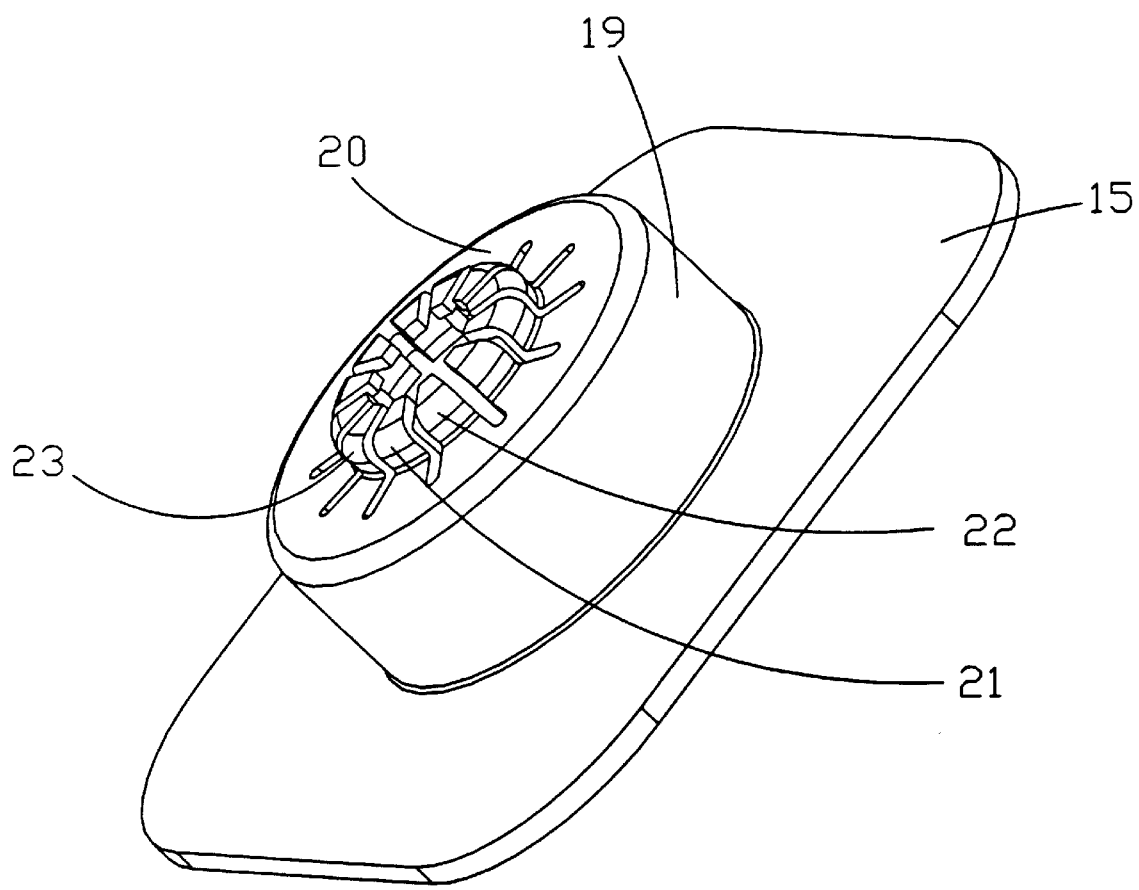
FIG. 1 illustrates a first preferred embodiment of the present invention wherein the disc holder has an adhesive-backed surface;.

FIG. 1 illustrates a first embodiment of the present invention which is shown generally at 10. In this embodiment, the digital optical compact disc is comprised of a substantially flat base 15. The flat base 15 is preferably adhesive-backed so that the disc holder may be advantageously secured to a flat surface such as wall or a location in the interior of a car. The entire disc holder is preferably manufactured of molded plastic and the flat base 15 may be formed in any of a variety of shapes including round, square and rectangular. The flat base 15 presents a raised centrally located protrusion 19 which has an elevated surface 20. A portion of a digital compact disc rests on the elevated surface 20. This elevated surface may also be referred to as the support surface and this support surface extends away from the primary surface.

A plurality of flexible detents 20, 21, 22 are substantially centrally located and molded into the elevated surface 20. The detents 20, 21, and 22 are circumferentially arranged to match the circumference of the hole in a digital compact disc. The plurality of flexible detents 20, 21, 22 are circumferentially located and are designed for temporarily securing the disc to the disc support 10. A disc mounted to the holder 10 is secured between the plurality of detents 20, 21, 22 and the elevated surface 20. An adhesive visual advertisement may be secured to the first surface 15 or the elevated surface 20. It will be recognized by those skilled in the art that the protrusion 19 is unnecessary and the disc itself may be supported on the first flat surface.

In such an embodiment, the detents would be circumferentially located in the first surface 14 and the disc would be secured between the detents and the flat surface 15.

Advantageously, the first surface may have a backing which contains a self-adhesive material for mounting the disc support 10 of the present invention onto a flat surface. The mounting location may be either horizontal or vertical but is preferably a vertical surface which may be adjacent to a person's computer or even located within an automobile for providing easy access to the digital audio compact discs.

Figure 2:
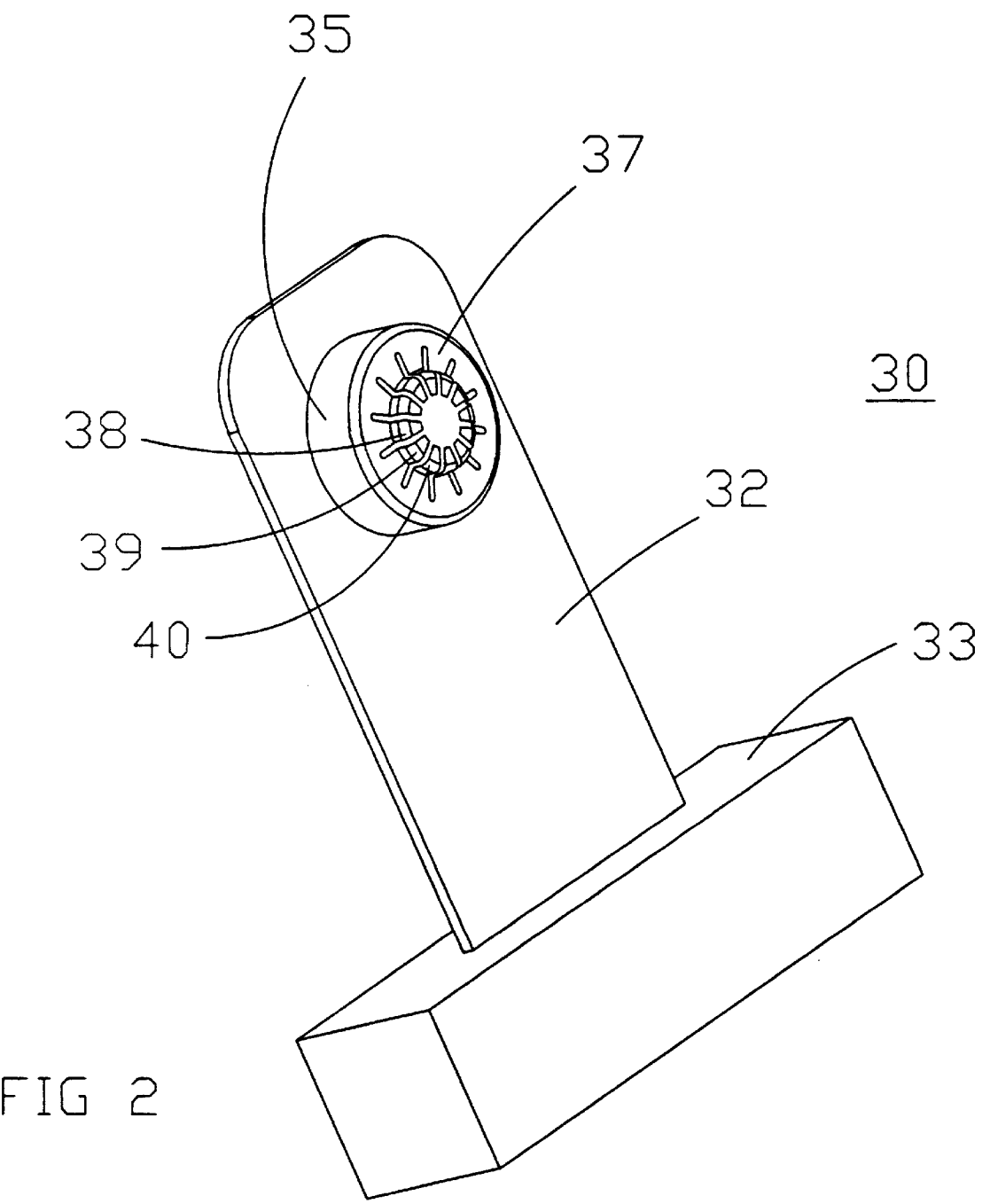
FIG. 2 illustrates an alternate embodiment of the present invention wherein the disc holder is incorporated into a weighted base.

FIG. 2 illustrates an alternate preferred embodiment of the present invention wherein the disc support is incorporated into a weighted base. This embodiment of the inventive disc holder is shown generally at 30. In this embodiment, a flat surface 32 protrudes from a weighted base 33. The flat surface 32 has a protrusion 35 which itself presents an elevated surface 37. The elevated surface 37 has a plurality of flexible detents 38, 39, and 40 which are substantially centrally located and form a circumference which match the circumference of the hole in a conventional digital optical compact disc.

Advantageously, the flat surface 32 may have an advertisement located on its surface. The advertisement may be a company name, logo or slogan for example. Corporations could distribute the disc holders of the present invention to promote products and the like while also providing their customers with a convenient and safe location for their digital optical compact discs.

Figure 3:
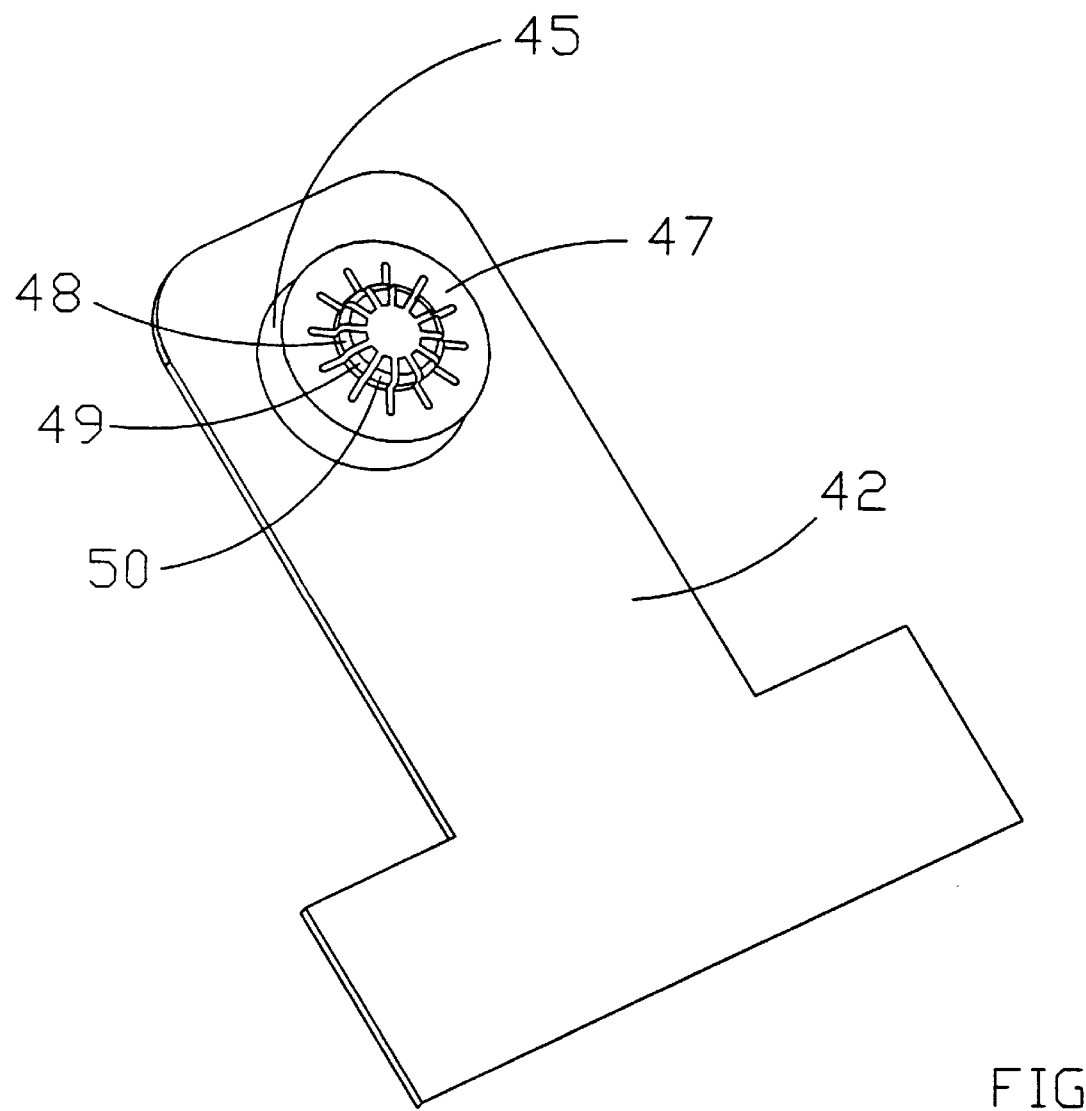
FIG. 3 illustrates a further embodiment of the present invention wherein the disc holder is attached to an elongated member.

As noted previously, although in this embodiment the flexible detents 38, 39, and 40 are shown as extending from an elevated surface 37, those skilled in the art will appreciate that the flexible detents could also be readily located in the first flat surface 20. it is merely preferred that the detents be located in a surface which is elevated from the first surface. This advantageously allows a person to secure and remove a disc from the disc holder more easily. Although the disc holder is functional with the disc mounted flat against the first surface, it is more difficult to grasp the disc when removing and replacing the disc. The elevated surface allows a user to readily grasp the edges of the disc when removing and replacing the disc from the holder. FIG. 3 illustrates a further alternate embodiment of the present invention wherein a flat surface is shown as an elongated member. The elongated shape provides greater surface area which improves the ability of the user to mount the device when it is adhesive-backed. Additionally, the increased surface area provides a more prominent and desirable location for a company to locate its name logo or slogan. Similar to the previously discussed embodiments, a protrusion 45 extends from the first surface 42. The protrusion 45 presents an elevated surface 47 upon which are located a plurality of detents 48,49, and 50 for securing a disc between the detents 48, 49, and 50 and the elevated surface 47.

FIG. 4 illustrates yet another alternate embodiment of the disc holder of the present invention which is shown generally at 55. In this embodiment the first flat surface 57 is mounted on a stiff or flexible rod 60. The stiff or flexible rod 60 is in turn secured to a suction cup 62 to attach the disc holder to a flat surface. A protrusion 63 extends from the first flat surface 57 and presents an elevated surface 65 upon which is located a plurality of detents 67, 68, 69 for securing a disc between the detents and the elevated surface 65. Those skilled in the art will appreciate that the suction cup 62 could be replaced alternately by an adhesive backed plastic support. One additional advantage of this embodiment is that the flexible rod provides eye-catching movement when a disc is attached to or removed from the disc holder. This is particularly desirable to advertisers who may provide these devices so that consumers will be drawn to their products through name recognition. As with the other adhesive backed designs, the disc holder of this embodiment may be secured to any available flat surface including the dash board of a car.

Figure 5:
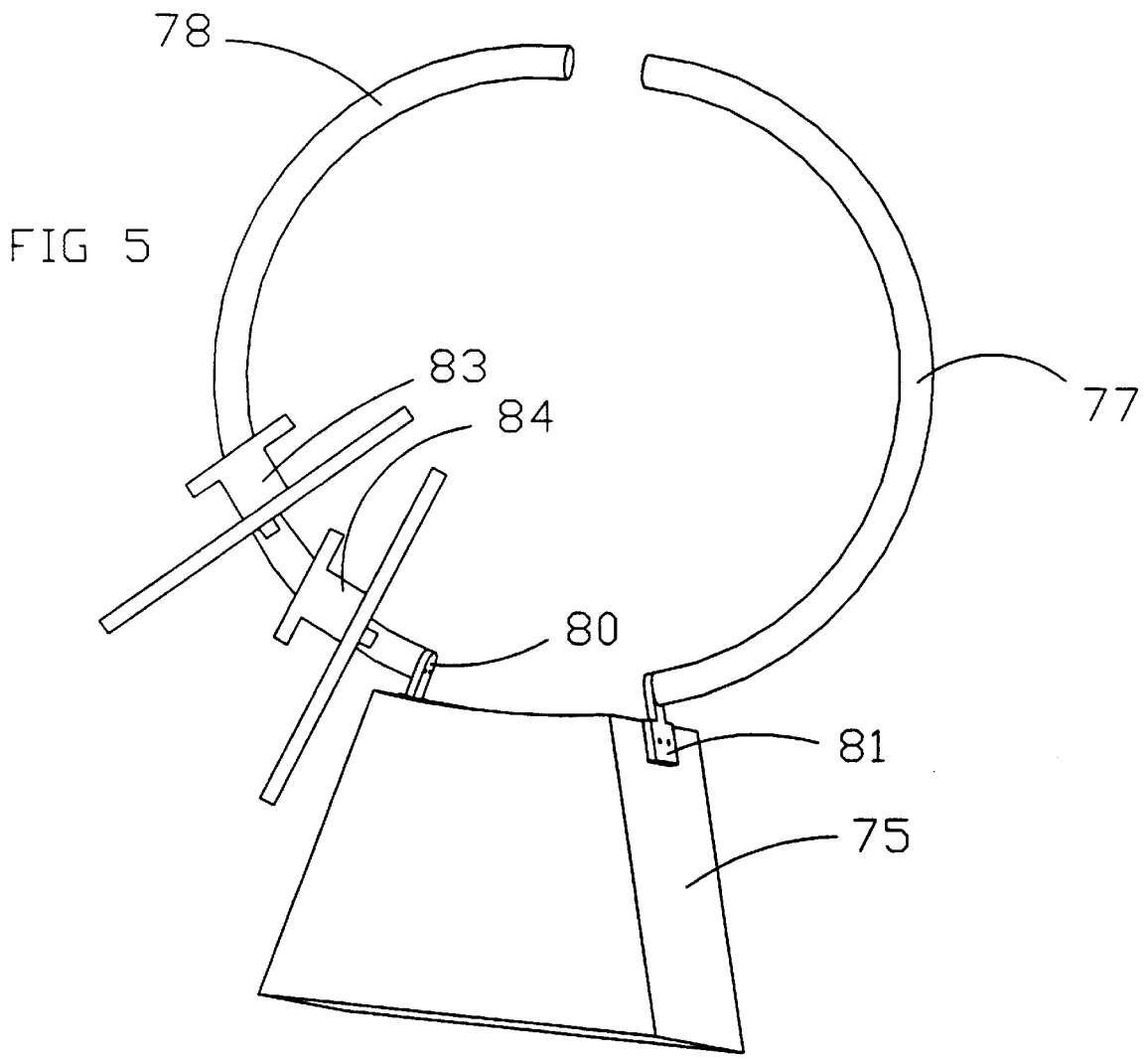
FIG. 5 illustrates a further embodiment of the present invention wherein the disc members are secured on rings.

FIG. 5 illustrates yet another alternate embodiment of the disc holder of the present invention. In this embodiment, a weighted base 75 provides support to at least one and desirably two semi-circular rings 77,78. The semi-circular rings 77, 78 are secured to the weighted base 75 via hinges 80, 81. A plurality of discs may be mounted on the semi-circular rings 77, 78.

In order to facilitate storage of optical discs on the rings, a plurality of disc spacers 83, 84 are in sliding engagement with at least one of the semi-circular rings 77,78. The disc spacers 83, 84 are hollow and tapered so that a digital optical compact disc may fit onto the spacer. The disc spacers 83, 84 are tapered so that the central hole in a digital optical compact disc may fit into the disc spacer. A plurality of flexible plastic detents temporarily secure the disc to the disc spacer. Once a disc is secured onto the disc space, the disc spacer may then be mounted on one of the semi-circular rings 77,78.

Figure 6:
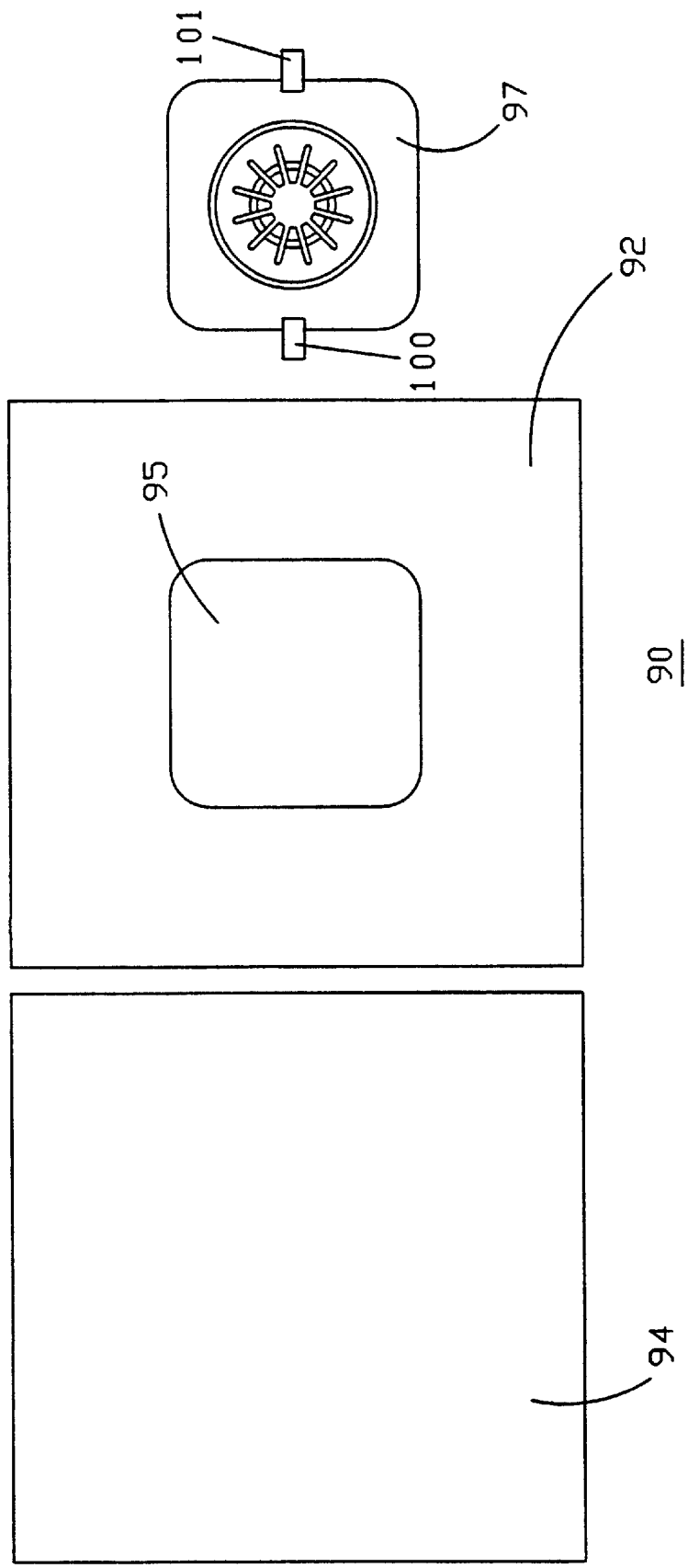
FIG. 6 illustrates a further embodiment of the present invention wherein the disc holder is incorporated into a convention disc package.

This embodiment of the disc holder may be conveniently located on a person's desk so that the person has convenient access to the discs. Advantageously the weighted base 75 may have a surface which presents an advertisement FIG. 6 illustrates an embodiment of the present invention wherein the disc holder of the present invention is incorporated into a conventional plastic disc storage device. The disc holder is shown generally at 90. The known folding disc package is comprised of a base 92 which is attached to a cover 94 with hinges as is known in the art and not shown. The base has a central depression 95 for receiving a disc holder and support 97. The disc holder and support has a shape which matches the shape of the depression 95 and is secured within the depression 95 via left and right clasps 100,101. The disc holder and support 97 is snap-fit into the base 92 and may be removed and located on a convenient vertical surface as noted above. The incorporation of the disc holder and support of the present invention in existing disc packages is therefore possible.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim as our invention:

1. An information storage disc housing comprising:
   a base;
   a top hingedly mounted to the base;
   a depression in a top surface of the base;
   a removable disc support secured within the depression said support having a top surface with at least one raised member which extends into a hole in a disc mounted on the support.

* * * * *